Aug. 21, 1945.   L. P. MILLARD   2,383,406
WHEEL MOUNTING
Filed Nov. 14, 1942   2 Sheets-Sheet 1

Inventor:
Lee P. Millard.
By Paul O. Pippel
Atty.

Aug. 21, 1945. L. P. MILLARD 2,383,406
WHEEL MOUNTING
Filed Nov. 14, 1942 2 Sheets-Sheet 2
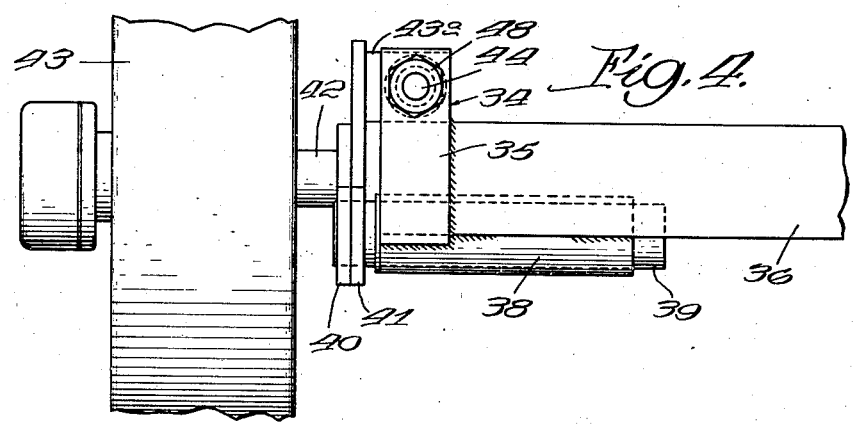
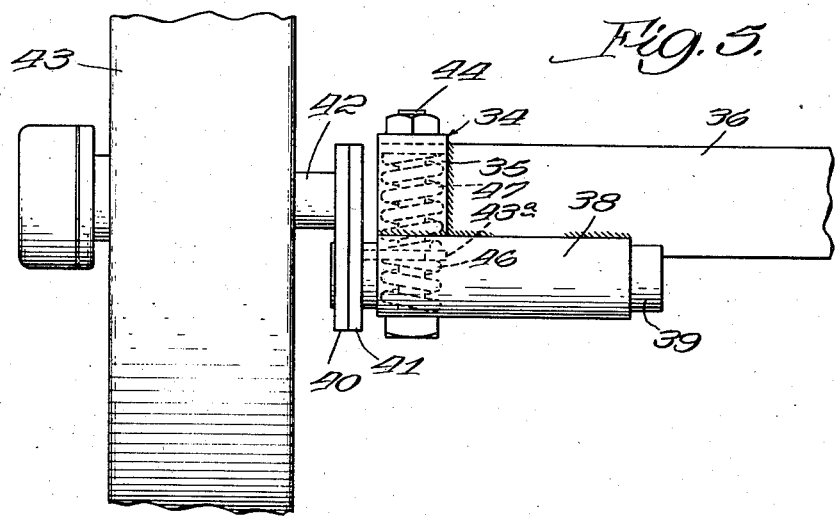
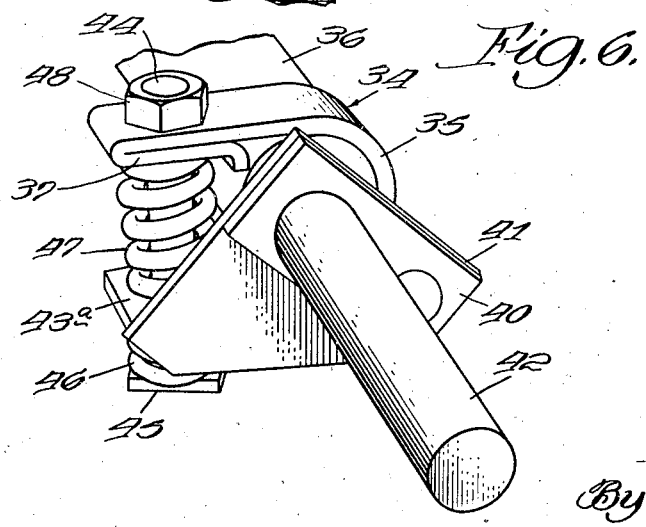
Inventor:
Lee P. Millard.

Patented Aug. 21, 1945

2,383,406

UNITED STATES PATENT OFFICE 2,383,406

WHEEL MOUNTING

Lee P. Millard, Moline, Ill., assignor to International Harvester Company, a corporation of New Jersey Application November 14, 1942, Serial No. 465,553

7 Claims. (Cl. 301—133)

This invention relates to a wheel mounting. More specifically it relates to a spring construction for connecting a supporting wheel to a vehicle. The scarcity of rubber has required the substitution of ordinary wheels with steel rims for wheels with rubber tires. Since a wheel having steel rims has no flexibility, some resiliency must be provided in the connection between the wheel and the vehicle which it supports.

An object of the present invention is to provide an improved wheel mounting.

Another object is the provision of a resilient wheel mounting.

Still another object is to provide a wheel mounting for a vehicle involving springs.

Other objects will appear from the disclosure.

According to the present invention, a steel wheel is connected to the supporting axle of a vehicle by means of an arm pivoted with respect to the axle about an axis offset from and parallel to the axle. Springs limit the movement of the arm with respect to the axle and cushion such movement.

In the drawings—

Figure 4 is a plan view of an axle, a wheel, and a modified form of wheel mounting;

Figure 5 is an elevational view of the structure shown in Figure 4; and

Figure 6 is a perspective end view of the structure shown in Figures 4 and 5 with the wheel removed.

Figure 1:
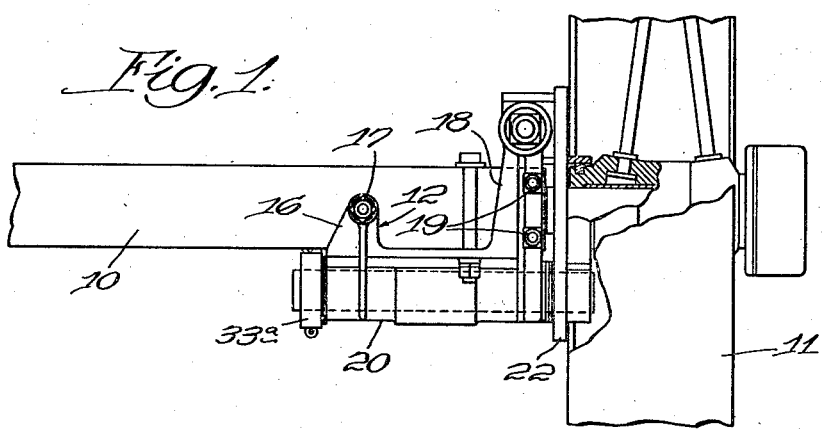
Figure 1 is a plan view, partially in section, showing an axle, a wheel, and a novel wheel mounting of the present invention.
Figure 2:
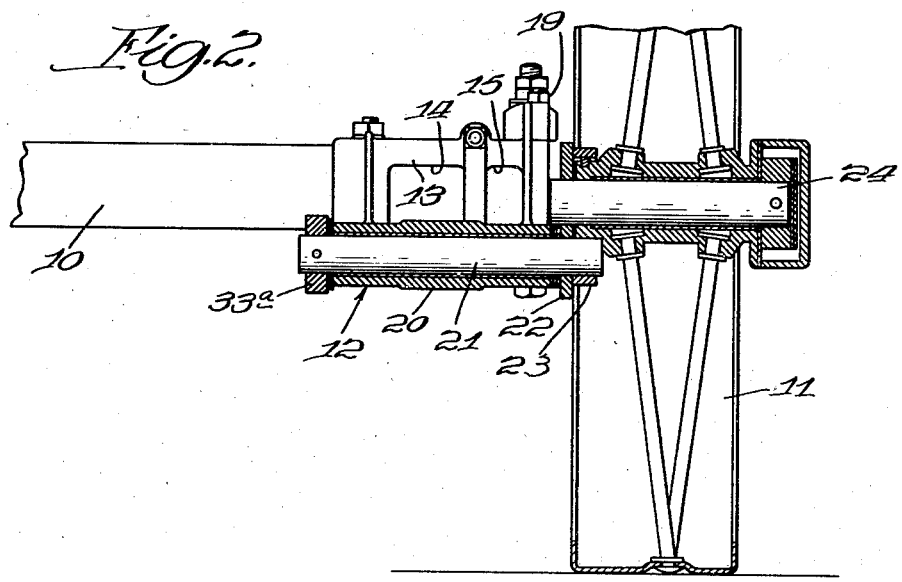
Figure 2 is an elevational view of the structure shown in Figure 1, partially in section.
Figure 3:
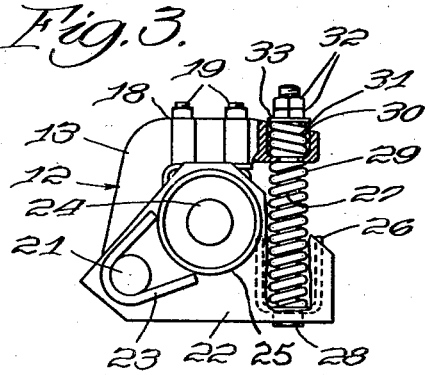
Figure 3 is an end view, partially in section, of the structure shown in Figures 1 and 2 with the wheel removed.

The reference character 10 designates an axle of a vehicle not otherwise shown. Positioned adjacent the end of the axle 10 is a metallic wheel 11 provided with a metallic rim. Secured to the axle 10 is a fitting 12 formed in one piece as by casting. The fitting 12 comprises a portion 13 extending from the bottom of the axle 10 along one side thereof and has cut-out sections 14 and 15. The fitting 12 also has a short portion 16 extending partially across the top of the axle 10, which is secured to the axle 10 by a bolt and nut 17. The fitting 12 also has a portion 18 extending across the top of the axle 10 and beyond the side opposite the side along which the portion 13 extends. A bolt and nut 19 secure the portion 18 to the top of the axle 10. The fitting 12 also includes a tubular portion 20 located at the bottom of the axle at the side thereof along which the portion 13 extends. Journaled within the portion 20 is a stub shaft 21 secured, as by welding, to a plate or arm 22 through which it extends, as indicated in Figure 2. Secured to the plate or arm 22 is a U-shaped projection 23 which embraces the portion of the stub shaft 21 protruding through the plate 22, as indicated in Figure 3. A stub axle 24 is secured in the plate 22 and extends downwardly therefrom. A projection 25 in the form of a ring is secured, as by welding, to the plate or arm 22, so as to be concentric with the stub axle 24. The ring projection 25 and stub axle 24 serve as a support for the wheel 11. A U-shaped part 26 is secured, as by welding, to one end of the plate or arm 22. A bolt 27 extends through the U-shaped part 26 and through the part of the portion 18 of the fitting 13 extending beyond the one side of the axle 10. A head 28 on the bolt 27 engages the under side of the U-shaped part 26. A spring 29 embraces the bolt 27 between the U-shaped part 26 and the under side of the portion 18. The portion 18 is provided with an enlarged recess 30 in which rests a spring 31 embracing the bolt 27. Nuts 32 and a washer 33 retain the spring 31 upon the bolt 27. A locking ring 33ª prevents the stub shaft 21 from coming out of the tubular portion 20.

It will be seen that the arm 22 and the wheel 11 tend to pivot about the axle 10 on the axis determined by the stub shaft 21. This pivoting movement is resisted by the springs 29 and 31, which are opposite to one another and provide a cushioning action between the axle 10 and the wheel 11.

In the modification shown in Figures 4, 5, and 6, there is provided a fitting 34, which is composed of a strap 35 embracing and welded to one side of the top of a circular axle 36. The strap 35 has a portion 37 extending beyond the top of the axle 36 and bent back upon itself. The fitting 34 also includes a tubular member 38 secured to the axle 36 by welding adjacent the base of one side thereof. A stub shaft 39 is journaled within the tubular member 38 and extends through and is secured to a plate 40 and plate or arm 41, as by welding. Plates 40 and 41 are secured to one another by welding. It will be observed from Figure 6 that the plate 40 is of narrow, rectangular shape, and the plate 41 is of generally triangular shape and extends completely across the end of the axle 36. A stub axle 42 extends through and is secured to the plates 40 and 41 by welding. A wheel 43 is mounted upon the stub axle 42. Secured to one end of the plate or arm 41 is a part 43ᵃ at one side of the axle 36. A bolt 44 extends through the part 43 and the bent portion 37 of the strap 35. The bolt 44 has an enlarged head 45, upon which rests a spring 46 embracing the bolt 44 and contacting the under side of the part 43ᵃ. A spring 47 embraces the bolt 44 and is positioned between the part 43ᵃ and the bent portion 37 of the strap 35. A nut 48 retains the bolt 44 in position. The journaling of the stub shaft 39 in the tubular member 38 in the fitting 35 allows the plates 40 and 41 and the wheel 43 to pivot about the axle 36 on an axis determined by the stub shaft 39. The springs 46 and 47, which are opposed to one another, limit this movement and provide a cushioning between the wheels 43 and the axle 36.

It will be apparent from the foregoing description that new and novel mountings for wheels upon an axle have been provided. In the two modifications described, there are provided fittings secured to axles. Wheels are resiliently connected to the axles by means of pivot arms and bolts embraced by opposed springs, which provide a cushioning limit to the movement between the wheels and the axles.

The intention is to limit the invention only within the scope of the appended claims.

What is claimed is:

1. In combination, an axle, a fitting extending at the end of the axle from the bottom thereof upwardly along one side thereof and across the top and beyond the other side, means securing the fitting to the axle, an arm extending across the end of the axle, means pivotally mounting one end of the arm on the fitting on a pivot axis parallel to the axle at one side and adjacent the bottom thereof, a wheel mounted at an intermediate point of the arm generally in alinement with the axle, a projection secured to the other end of the arm at the said other side of the axle, a pin extending along the said other side of the axle through the projection and a portion of the fitting at the said other side of the axle and carrying a head engaging the under side of the projection and spring-retaining means spaced from and above the fitting, and a spring embracing the pin between the fitting and the projection.

2. In combination, an axle, a fitting extending at the end of the axle from the bottom thereof upwardly along one side thereof and across the top and beyond the other side, means securing the fitting to the axle, an arm extending across the end of the axle, means pivotally mounting one end of the arm on the fitting on a pivot axis parallel to the axle at one side and adjacent the bottom thereof, a wheel mounted at an intermediate point of the arm generally in alinement with the axle, a U-shaped part secured to the other end of the arm at the said other side of the axle, a pin extending along the said other side of the axle through the U-shaped part and a portion of the fitting at the said other side of the axle and carrying a head engaging the under side of the U-shaped part and spring-retaining means spaced from and above the fitting, and a spring embracing the pin between the fitting and the U-shaped part.

3. In combination, an axle, a fitting extending at the end of the axle from the bottom thereof upwardly along one side thereof and across the top and beyond the other side, the portion extending beyond the said other side of the axle having a large spring-receiving opening extending from the top to a point near the bottom of the portion and a small opening extending from the spring-receiving opening to the bottom of the portion, means securing the fitting to the axle, an arm extending across the end of the axle, means pivotally mounting one end of the arm on the fitting on a pivot axis parallel to the axle at one side and adjacent the bottom thereof, a wheel mounted at an intermediate point of the arm generally in alinement with the axle, a projection secured to the other end of the arm at the said other side of the axle, a pin extending along the said other side of the axle through the projection and through the small opening and the large spring-receiving opening in the said portion of the fitting and having an enlarged portion engaging the bottom of the projection and a spring-retaining means positioned above the said portion of the fitting, a first spring embracing the pin between the projection and the said portion of the fitting, and a second spring embracing the pin and resting within the large spring-receiving opening and extending up to the spring-retaining means.

4. In combination, an axle, a fitting extending at the end of the axle from the bottom thereof upwardly along one side thereof and across the top and beyond the other side, the portion extending beyond the said other side of the axle having a large spring-receiving opening extending from the top to a point near the bottom of the portion and a small opening extending from the spring-receiving opening to the bottom of the portion, means securing the fitting to the axle, an arm extending across the end of the axle, means pivotally mounting one end of the arm on the fitting on a pivot axis parallel to the axle at one side and adjacent the bottom thereof, a wheel mounted at an intermediate point of the arm generally in alinement with the axle, a U-shaped part secured to the other end of the arm at the said other side of the axle, a pin extending along the said other side of the axle through the U-shaped part and through the small opening and the large spring-receiving opening in the said portion of the fitting and having an enlarged portion engaging the bottom of the U-shaped part and a spring-retaining means positioned above the said portion of the fitting, a first spring embracing the pin between the projection and the said portion of the fitting, and a second spring embracing the pin and resting within the large spring-receiving opening and extending up to the spring-retaining means.

5. In combination, an axle, a fitting extending at one end of the axle from the bottom at one side to the top and along the top to and beyond the other side, an arm extending across the said one end of the axle, a stub shaft extending through and secured to one end of the arm so as to provide a portion of considerable length at one side of the arm serving as a pivotal mounting for the arm and a short portion protruding from the other side of the arm, an annular projection secured to a mid-portion of the arm, a U-shaped projection secured to the arm and extending around the short portion of the stub shaft to the annular projection, a wheel mounted on the annular projection, a spring-supporting part secured to the other end of the arm at the said other side of the axle, a pin extending at the said other side of the axle through the spring-supporting part and a portion of the fitting at the said other side of the axle, and having an enlarged portion engaging the bottom of the spring-supporting part and a spring-retaining means above the said portion of the fitting, a first spring embracing the pin between the fitting and the spring-supporting part, and a second spring embracing the pin between the fitting and the spring-retaining means.

6. In combination, an axle, a fitting extending at the end of the axle from the bottom thereof upwardly along one side thereof and across the top and beyond the other side, means securing the fitting to the axle, an arm extending across the end of the axle, means pivotally mounting one end of the arm on the fitting on a pivot axis parallel to the axle at one side and adjacent the bottom thereof, a wheel mounted at an intermediate point of the arm generally in alinement with the axle, a projection secured to the other end of the arm at the said other side of the axle, a pin extending along the said other side of the axle through the projection and a portion of the fitting at the said other side of the axle and carrying an enlarged part engaging the top of the fitting and spring-retaining means spaced from and below the projection, a first spring embracing the pin between the fitting and the projection, and a second spring embracing the pin between the projection and the spring-retaining means.

7. In combination, an axle, an attaching structure stationarily affixed to the axle and extending at one end of the axle from the bottom at one side to the top and along the top, said structure having an apertured projection extending beyond the other side of the axle, a plate extending across the said one end of the axle, a stub shaft rigidly secured to said plate for pivotally mounting the arm on the fitting on an axis parallel to the axle and positioned adjacent the said one side and bottom of the axle, a lateral projection secured to the other end of the plate at the said other side of the axle, said projection having an aperture in alignment with the first mentioned apertured projection, a pin extending at the said other side of the axle through the apertures of the projections, and a spring mounted on the pin between the projections and reacting thereagainst.

LEE P. MILLARD.